United States Patent Office 2,763,500
Patented Sept. 18, 1956

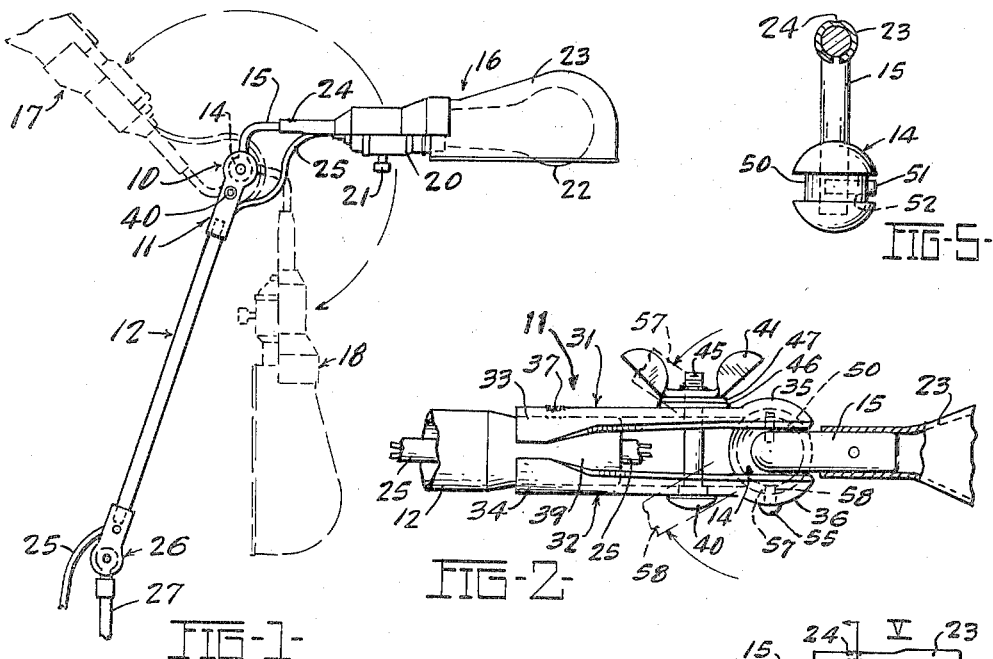

2,763,500

UNIVERSAL BALL AND SOCKET JOINT

Howard B. Turner, Fostoria, Ohio, assignor to Fostoria Pressed Steel Corporation, Fostoria, Ohio, a corporation of Ohio Application August 22, 1952, Serial No. 305,750

9 Claims. (Cl. 287—12)

This invention relates to a ball and socket type of universal joint which is limited from complete relative rotation of its parts. More particularly, it deals with a universal frictionally adjustable ball and socket type joint for a flexible support, such as a lamp support, which joint has at least 270° of movement in two planes at right angles to each other but is limited from complete rotation to prevent the twisting of the lamp cord which it may support.

It is an object of this invention to provide a simple, safe, efficient, economical, and effective ball and socket type joint.

Another object is to provide a frictionally adjustable universal ball and socket type joint in a support which permits movement more than 270° in two planes at right angles to each other but limits movement from complete rotation of the ball with respect to the socket in any direction.

Another object is to provide a universal ball and socket type articulated electric joint for lamp support, which prevents the twisting and binding of the electric conductor to the lamp which passes the joint along the support, thereby preventing severance or possible strain or wearing of the conductor at the joint which might cause short circuits, electric shock, or fire.

Generally speaking, the ball and socket joint of this invention is adapted for universal friction positioned supports, in which the ball is connected to one member of the support and the socket is connected to another member of the support. The connection to the ball is preferably radially outwardly from the surface of the ball in one direction only, and the connection to the socket may be of any type which permits freedom of movement of the ball connection through at least 270° in one plane, such as a slot between two complementary cupped shaped socket sections. Since the device of this invention is particularly adapted to frictionally position the ball in the socket, one of the socket sections may be adjustably movable toward the other as a clamping device, such as by a screw and wing-nut assembly.

The improvement of this invention for such a ball and socket joint resides in providing a circumferential groove in the ball, preferably at right angles to its connecting member, which groove has a stop therein to make it discontinuous with the two ends of the groove adjacent each other, preferably less than about 30° apart and as close as practically possible depending on the dimensions and strength of the joint parts. Cooperating with this groove in the ball is a projecting peg or pin anchored in the cup portion of one of the sockets, which peg is slidable in said groove but is limited in its relative movement to the ball by the ends of the groove or the stop in said groove. Thus rotation of the ball with respect to the socket is limited to less than one complete rotation by the peg and stop. Rotation of the ball in the socket is further limited in rotation by the necessary connection to the socket of its supporting member, which preferably permits movement of at least 270° in the plane of the slot between the socket sections, as mentioned above.

Thus, if for example, the ball and socket joint of this invention were connected between two tubular members of a support for an electrical fixture, such as a lamp, in which the electric conductor for the fixture passed through or along the tubular members, and thei bridged the joint, the electric conductor never could be twisted more than one revolution because of the stop provided in the joint.

The above mentioned and other features and objects of this invention and the manner of attaining them are given more specific disclosure in the following description of an embodiment of this invention taken in conjunction with the accompanying drawing, wherein:

Fig. 1 is a side elevation of an articulated electric lamp support provided with one embodiment of a universal ball and socket joint according to this invention at the lamp end of the support, showing the wide degree of freedom of movement of the lamp portion with respect to its adjacent support, by dotted line positions of the lamp porion;

Fig. 2 is an enlarged top plan view of the lamp engaging joint shown in Fig. 1, with parts of joint supporting members broken away;

Fig. 3 is a side view of the joint in Fig. 2, with one of the socket sections and its clamp broken away;

Fig. 4 is a sectional view taken along line IV—IV of Fig. 3 on a slightly enlarged scale, showing the stops in the grooves of the ball element;

Fig. 5 is an end view of the ball element of the joint taken along line V—V of Fig. 3;

Fig. 6 is a view similar to Fig. 5, but a modified form of ball element for the joint of this invention.

Referring to Fig. 1, there is shown an articulated utility lamp of the type used by machinists in operating their machines, comprising one embodiment of a universal ball and socket type joint 10 according to this invention, in which the socket portion 11 is attached to the upper end of a tubular member 12, and the ball element 14 is attached by a rod 15 to the lamp portion 16. The universality of the vertical movement of the lamp with respect to the support member 12 is shown by the dotted line positions 17 and 18 of the lamp 16. The extreme or limiting positions of the lamp 16 are when the lamp 16 or its supporting rod 15 contacts opposite sides of the upper end of the tubular member 12, or with the opposite converging edges of the slot formed between the two parts or sections of the ball socket portion 11 (see also dotted line positions of rod 15 in Fig. 3). The lamp portion 16 is shown herein to have an electric bulb socket 20 with a switch 21 and an electric light bulb 22 in the socket 20, all of which may be protected by a cover and shade portion 23, which may be fastened by welding and/or crimping 24 to the rod 15. From the socket 20 an electric insulated conductor wire or cable 25 may extend, with some slack to permit easy flexibility and movement, into the upper open end of the tubular supporting member 12, between the sections or socket members of the ball socket portion 11, and then through the tube 12 and out at its lower end for connection to an electric current source (not shown). This lower end of the tubular member 12 is also shown to be provided with another and common type of ball and socket joint 26, which in turn may connect with a further tubular supporting member 27 for further articulation of the support for the lamp. However, the electric conductor 25 is not shown entering the tubular member 27 because the joint 26 is not the same as joint 10 and is not limited in its rotational movements and accordingly would not prevent the cord 25 from becoming twisted between the two members 12 and 27. This does not mean that a joint as joint 10 could not be used for joint 26, so that the conductor wire 25 could be threaded back into the end of the tubular member 27 with safety, if desired.

The remaining figures show the details of the joint 10 according to the embodiments of this invention, in which the ball socket portion 11 may be composed of two similar complementary spaced sections or members 31 and 32, each having trough shank portions 33 and 34 and cupped socket portions 35 and 36, respectively. One section 31 may be welded or otherwise fastened at 37 to one end of the tubular supporting member 12 for the socket portion. The end of the tubular member 12 may be reduced in diameter at its end 39 adjacent the socket portion 11, so as to provide a smoother outside appearing junction between the shanks of socket portion 11 and tubular member 12. The other section or member 32 of the socket portion 11 may be fastened to the first section or member 31 by means of an adjustable clamping device such as a bolt 40 with a wing-nut 41 which passes through holes in the shanks 33 and 34 of the two sections 31 and 32 between their ends where they contact the tubular member 12 and their complementary cupped socket sections 35 and 36, respectively. The bolt 40 may be of the carriage bolt type with the square portion 42 (see Fig. 4) adjacent its head fitting into a square hole 43 in the shank 34 to prevent the turning of the bolt when the wing-nut 41 is turned. The hole 44 in the shank 33 of the other section 31 preferably is larger than the outside diameter of the threads 45 of the bolt 40 to prevent binding of the threads 45 in said hole 44, and metal and resilient washers 46 and 47 may be provided between the wing-nut 41 and the outer surface of the shank 33 for easy and good friction clamping of opposite sides of the ball element 14 by the two complementary cup-shaped socket sections 35 and 36. The two socket clamping sections or members 31 and 32 are proportioned to provide a slot between them of sufficient width to permit the rod connection 15 to the ball element 14 to be movable around the slot when the sections 31 and 32 are in clamped position. The clamping of the socket portions 35 and 36 by means of the wing-nut 41 also causes the trough of the shank 34 of section 32 to clamp the reduced end 39 of the tubular member 12, and to keep section 32 in position and prevent its rotation around the axis of the bolt 40.

The ball element 14, which is clamped between the cup-shaped sections 35 and 36 of the socket portion 11, comprises a sphere around an equator or great circle of which is a groove 50. This groove 50 is preferably equatorial to the polar projection of the rod 15, so as to permit rotational movement around the axis of the rod and groove. At one spot in this groove is placed a stop, such as a screw, rivet, spirally fluted drive pin 51 or the like, (see Figs. 2 through 5) which forms two ends to the circumferential groove 50. This pin 51 may be screwed, driven, forced or shrunk fitted into a hole 52 drilled into the ball 14 as shown, and may also act as an anchor or key for the end of the rod 15 (see Fig. 4).

Cooperating with the groove 50 and the stop pin 51, is a projection screw, peg, drive pin or rivet 55 (see Fig. 4), which is fastened in the cupped portion of one of the socket sections, herein shown to be in section 36. One end of this rivet 55 fits, rotates and slides in the groove 50, as the ball 14 is turned, to guide the movement of the ball 14 and prevent it from making a complete rotation, because of the abutting contact between the rivet 55 and the sides of the stop pin 51, which act as the ends and limits of the groove 50. The dotted positions 57 and 58 of the rod 15 in Fig. 2 show its limits of rotation in planes perpendicular to that of the slot between the socket sections 31 and 32. The peg 55 is preferably placed at the bottom of the cup-shaped portion 36 as shown, however, any one other location on the inside cupped bearing surface of the socket could be used.

Instead of placing a pin or stop 51 in the continuous groove 50 to make it discontinuous as shown in the preceding figures, a discontinuous groove 60 may be formed in a ball element 64 (similar to element 14) as shown in Fig. 6 in which a dam 61 across the groove 60 limits the rotational movement of the ball 64. Furthermore, the rod connection 65 (corresponding to rod 15) may be welded at its end 66 to the ball instead of shrunk or keyed in a hole in the ball as shown in Figs. 3 through 5.

Thus, with the improved ball and socket joint for an articulated supporting member as described above, greater than 270° of movement in two planes at right angles to each other can be obtained, which is as much as and often more than can be obtained with a common type of ball and socket joint such as joint 26. However, the joint of this invention has the additional advantage that the parts cannot be rotated more than one revolution relative to each other to twist any flexible connection which may be bridged across the joint so that when used on an articulated lamp support, the light thereof may be directed in any direction that any other ball and socket joint could direct it without having the disadvantage of possibly twisting and breaking the conducting wire by repeated adjusting movements.

While there is described above the principles of this invention in connection with specific apparatus, it is to be clearly understood that this description is made only by way of example and not as a limitation to the scope of this invention.

What is claimed is:

1. A ball and socket joint in which their relative movement is limited from complete rotation, comprising a ball having an equatorial groove with a stop therein, said groove being continuous for more than 270° of arc but less than 360° of arc because of said stop, a pair of spaced complementary socket members engaging opposite sides of said ball, a radially extending member from said ball through the space between said socket members, a connecting member between said socket members in the path of movement of said radially extending member to limit the movement thereof to less than 360° in said space, and a guide projecting from the inner surface of one of said socket members being relatively slidable and rotatable in said groove between opposite sides of said stop.

2. A joint according to claim 1 wherein said stop comprises a pin projecting into said groove.

3. A joint according to claim 1 wherein said stop comprises a dam across said circumferential groove.

4. A joint according to claim 1 wherein said groove and said radially extending member are equatorial and polar respectively in position with respect to each other.

5. A joint according to claim 1 wherein said connecting member between said socket members comprises a screw clamping device for urging said pair of socket members together against said ball.

6. A joint according to claim 1 for an articulated lamp support wherein said ball and socket joint is between two parts of said support, one of said parts being connected to said radially extending member from said ball and the other of said parts being connected to at least one of said socket members.

7. A joint according to claim 6 wherein said radially extending member supports the lamp.

8. A ball and socket joint comprising: a ball having a continuous equatorial groove and a connecting member extending radially from one pole of said ball, a first radial pin projecting outwardly into said groove, a pair of complementary spaced cup shaped socket members, means bridging a portion of the space between said socket members for clamping said socket members around opposite sides of said ball and said connecting member, and a second radial pin projecting inwardly from one of said socket members into said groove, whereby the contact of said first pin with said second pin in said groove prevents complete rotation of said ball between said socket members in the plane of said groove, and whereby the contact of said connecting member and said clamping member for said sockets prevents complete rotation of said ball in the plane of the space between said complementary cup shaped socket members.

9. A joint according to claim 8 wherein said pins occupy less than 30° of the circumference of said ball.

References Cited in the file of this patent

UNITED STATES PATENTS

| | | |
|---|---|---|
| 572,635 | Heineken | Dec. 8, 1896 |
| 788,035 | Ferguson | Apr. 25, 1905 |
| 1,036,739 | Sorensen | Aug. 27, 1912 |
| 1,290,830 | Del Fungo-Giera | Jan. 7, 1919 |
| 2,524,894 | Dobrin | Oct. 10, 1950 |